T. FAIRBANKS.
Balance Scales.
No. 6,169.
Patented March 13, 1849.
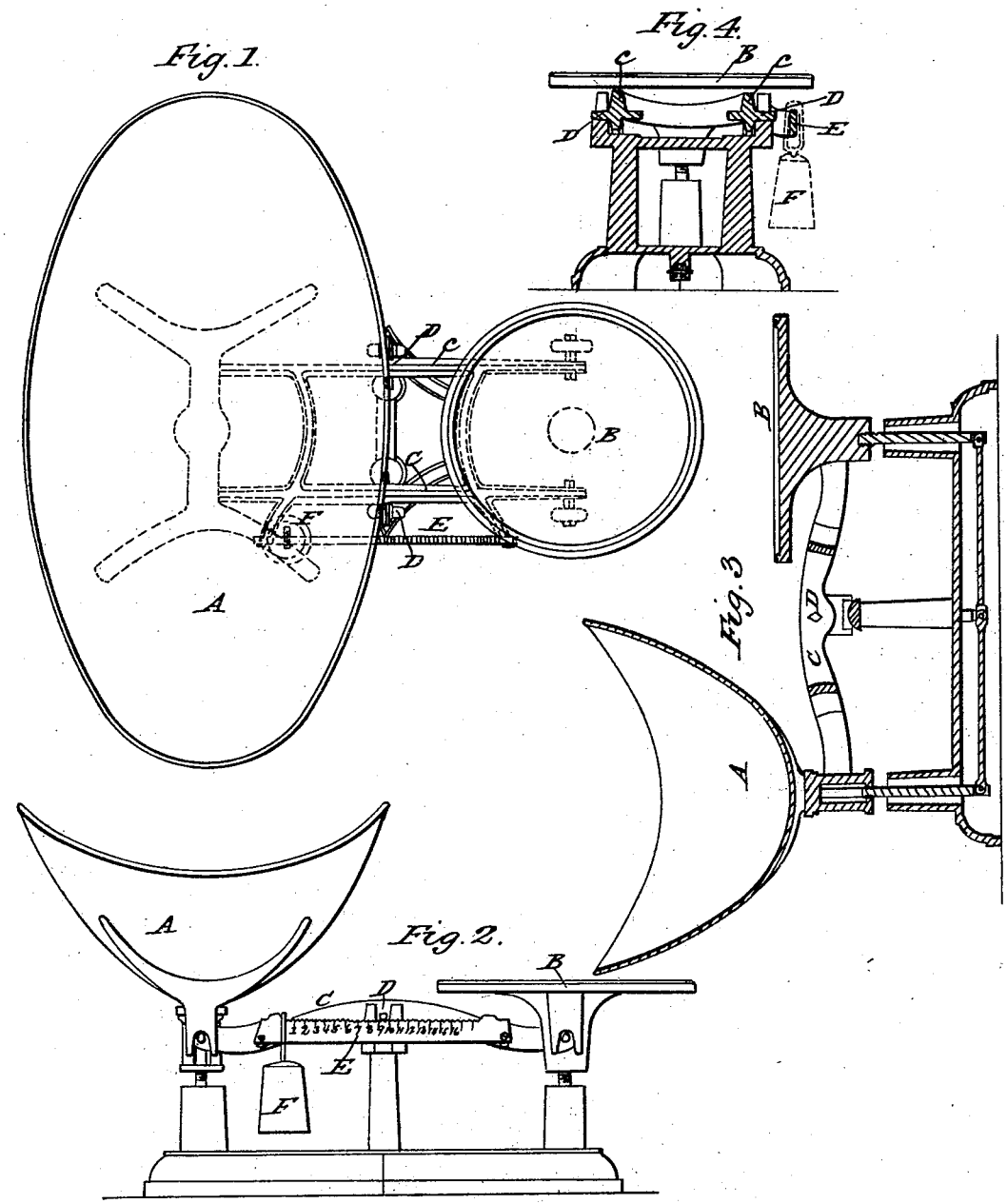

UNITED STATES PATENT OFFICE.

THADDEUS FAIRBANKS, OF ST. JOHNSBURY, VERMONT.

IMPROVEMENT IN DOUBLE-SCALE BALANCES.

Specification forming part of Letters Patent No. 6,169, dated March 13, 1849.

*To all whom it may concern:*

Be it known that I, THADDEUS FAIRBANKS, of St. Johnsbury, in the county of Caledonia and State of Vermont, have invented a new and useful Improvement in Common Double-Scale Balances for Weighing; and I do hereby declare that the same is fully described and represented in the following specification and accompanying drawings, letters, figures, and references thereof.

Of the said drawings, Figure 1 denotes a top view of my improved balance; Fig. 2, a side elevation of it; Fig. 3, a central vertical and longitudinal section of it, and Fig. 4 a transverse and central section of it.

The principle of my improvement, as it is represented in the drawings, springs from the balance being constructed with a lever and two scale-pans of unequal weights applied to its ends, one of the said scale-pans being for the reception of the article or substance to be weighed, and the other for that of even weights, the fractional parts of a pound or other base-weight being ascertained by means of a divided and numbered scale and a weight movable thereon.

The peculiar object of the improvement is to enable a person on the double-scale-pan lever-balance, or that made with arms of equal lengths, to obtain fractional parts of a pound or ounce without rendering it necessary to employ a series of small weights, such as represent a half-pound, a quarter of a pound, an ounce, half-ounce, quarter-ounce, &c.

In the drawings above mentioned, A represents one scale-pan, and B the other or weight-platform, as applied in the usual manner to a balance beam or lever, C, whose arms on opposite sides of the fulcrum D or fulcra are of equal lengths. E is a scale or rule attached to said balance-beam by means of projections therefrom, or in any other convenient and proper manner. On this scale a determining poise or weight, F, is hung, and when placed at one extremity of the scale serves to balance the two scale-pans, but which, when moved away from said extremity toward the other, determines the fractional weight or difference between the weight placed in one scale-pan and that in the other.

The scale may be so arranged on the beam that it may have the fulcrum of the said beam between its extremities; or the scale may be entirely on one side of the fulcrum; or it may be made to extend out from one end of the beam. In Figs. 1, 2, and 4 it is shown as projecting about an equal distance on each side of the fulcrum. The practical mode of applying and graduating it is as follows:

The scale-pan B, or weight on one end of the lever-beam, being constructed somewhat heavier than that at the opposite end of the beam, I apply the weight or poise F to that end or terminus of the scale E nearest to the lighter scale-pan, and I reduce or increase said weight until the lever-beam is brought by it into a horizontal position, or, in other words, is balanced. I next place a pound-weight in the said lightest scale-pan, and afterward move the sliding weight on the scale until it is carried into such position as to again balance the scales or lever. This done, I mark the position of it on the scale as the other terminus of said scale. Next I divide the distance between the said two termini into as many equal parts as I may desire in order to represent ounces and fractional parts of the same. This being done, the scale is properly numbered, and is completed. Instead of the above, I may adopt any other convenient and proper mode of adapting the scale and poise to each other and the beam and scale pans or platforms. The balance may be made in such manner that its scale-pans may bear equally upon the extremities of the beam with equal arms. In this case one terminus of the scale must be at the fulcrum of the balance; but in general it is better, for the sake of symmetry or appearance, to make the balance-beam and apply the scale in such manner as that its two termini may be on opposite sides of the fulcrum or turning-pivot.

In Letters Patent of the United States of America, granted to me on the 15th day of September, A. D. 1846, I have claimed the invention of an auxiliary scale and weight combined with the main weight and scale for a steelyard-balance. My present and hereinbefore-described improvement is essentially different from the said patented invention, the auxiliary scale and its weight in my former invention being movable with the weight, whereas in my present invention I use but one scale, and that is fixed in its position upon and to the balance with two scale-pans—an article essentially different from the steelyard-balance. My invention differs from any mode of weighing by the steelyard-balance, and is in no respect claimed by me as applied thereto. I do not intend to limit the application of the scale and its weight to the side of the balance-beam, as the said application is represented in the figures, as it (the scale) may be attached to the beam so as to be either above it or below it. Neither do I mean to limit it to a balance-beam which has its scale pans or platforms arranged above it, or made to rest upon it, as it may also be applied to one which has the scale-pans suspended from the two ends of the balance-beam.

What therefore I claim as my invention is—

The graduated scale E and sliding or movable weight F thereof, in combination with the balance-beam (having arms of equal lengths) and its two scale pans or platforms for sustaining weights, the whole being constructed and made to operate substantially in manner and for the purpose as hereinabove specified.

In testimony whereof I have hereto set my signature this 17th day of July, A. D. 1848.

THADDEUS FAIRBANKS.

Witnesses:
R. H. EDDY,
F. GOULD.